(12) United States Patent
Black

(10) Patent No.: US 10,075,313 B2
(45) Date of Patent: Sep. 11, 2018

(54) PILOT GROUPING AND ROUTE PROTOCOLS IN MULTI-CARRIER COMMUNICATION SYSTEMS

(71) Applicant: QUALCOMM Incorporated, San Diego, CA (US)

(72) Inventor: Peter John Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/584,920

(22) Filed: May 2, 2017

(65) Prior Publication Data

US 2017/0237589 A1    Aug. 17, 2017

Related U.S. Application Data

(62) Division of application No. 14/108,055, filed on Dec. 16, 2013, which is a division of application No. 11/523,959, filed on Sep. 19, 2006.

(Continued)

(51) Int. Cl.
*H04W 72/00*    (2009.01)
*H04L 27/26*    (2006.01)
(Continued)

(52) U.S. Cl.
CPC .......... *H04L 27/261* (2013.01); *H04L 1/0026* (2013.01); *H04L 1/1671* (2013.01);
(Continued)

(58) Field of Classification Search
CPC .... H04W 36/18; H04W 74/04; H04L 27/261; H04L 27/2631; H04L 1/0026;
(Continued)

(56) References Cited

U.S. PATENT DOCUMENTS 5,577,022 A    11/1996    Padovani et al.
5,602,833 A    2/1997    Zehavi
(Continued)

FOREIGN PATENT DOCUMENTS

CN    1327694    12/2001
EP    1081876 A2    3/2001
(Continued)

OTHER PUBLICATIONS

Wireless2000, 2000, J Luo et al., Optimal Timer Settings for the Soft Handover Algorithm in WCDMA, pp. 1-8.
(Continued)

*Primary Examiner* — Wayne H Cai
(74) *Attorney, Agent, or Firm* — Arent Fox, LLP

(57) ABSTRACT

Embodiments disclosed herein relate to methods and systems for pilot grouping, route protocols, and scheduling in multi-carrier communication systems. In an embodiment, an access terminal may group a plurality of pilot signals characterized by different frequencies into one or more pilot groups, each pilot grouping being identified by a plurality of parameters (e.g., a PN offset and a group ID). Each pilot group may include pilot signals having substantially the same coverage area. The access terminal may further select a representative pilot signal from each pilot group for pilot strength reporting. The access terminal may also use the pilot grouping for effective set management.

30 Claims, 14 Drawing Sheets

Related U.S. Application Data

(60) Provisional application No. 60/719,760, filed on Sep. 22, 2005.

(51) Int. Cl.
*H04L 1/00* (2006.01)
*H04L 1/16* (2006.01)
*H04L 5/00* (2006.01)
*H04W 36/18* (2009.01)
*H04W 74/04* (2009.01)

(52) U.S. Cl.
CPC ............ *H04L 5/005* (2013.01); *H04L 5/0007* (2013.01); *H04L 5/0037* (2013.01); *H04L 5/0091* (2013.01); *H04L 27/2613* (2013.01); *H04W 36/18* (2013.01); *H04W 74/04* (2013.01)

(58) Field of Classification Search
CPC ..... H04L 1/1671; H04L 5/007; H04L 5/0037; H04L 5/005; H04L 5/0091
See application file for complete search history.

(56) References Cited

U.S. PATENT DOCUMENTS

| | | |
|---|---|---|
| 5,867,478 A | 2/1999 | Baum et al. |
| 6,151,508 A | 11/2000 | Kim et al. |
| 6,172,993 B1 | 1/2001 | Kim et al. |
| 6,205,132 B1 | 3/2001 | Hong et al. |
| 6,366,779 B1 | 4/2002 | Bender et al. |
| 6,430,414 B1 | 8/2002 | Sorokine et al. |
| 6,456,606 B1 | 9/2002 | Terasawa |
| 6,496,531 B1 | 12/2002 | Kamel et al. |
| 6,697,629 B1 | 2/2004 | Grilli et al. |
| 7,085,310 B2 | 8/2006 | Chen et al. |
| 7,206,598 B2 | 4/2007 | Attar et al. |
| 7,269,145 B2 | 9/2007 | Koo et al. |
| 7,339,999 B2 | 3/2008 | Gore et al. |
| 7,420,939 B2 | 9/2008 | Laroia et al. |
| 7,630,719 B2 | 12/2009 | Bender et al. |
| 8,150,408 B2 | 4/2012 | Rezaiifar et al. |
| 2002/0025001 A1 | 2/2002 | Ismaeil et al. |
| 2002/0159470 A1 | 10/2002 | Atarashi et al. |
| 2003/0008663 A1 | 1/2003 | Stein et al. |
| 2003/0035393 A1 | 2/2003 | Sinnarajah et al. |
| 2003/0174643 A1 | 9/2003 | Ro et al. |
| 2004/0008630 A1 | 1/2004 | Corson et al. |
| 2004/0151122 A1 | 8/2004 | Lau et al. |
| 2004/0160919 A1 | 8/2004 | Balachandran et al. |
| 2004/0166887 A1 | 8/2004 | Laroia et al. |
| 2004/0179506 A1 | 9/2004 | Padovani et al. |
| 2004/0190471 A1 | 9/2004 | Bender et al. |
| 2004/0203420 A1 | 10/2004 | Rick et al. |
| 2004/0266466 A1 | 12/2004 | Kim et al. |
| 2005/0009528 A1 | 1/2005 | Iwamura et al. |
| 2005/0157801 A1 | 7/2005 | Gore et al. |
| 2005/0159185 A1 | 7/2005 | Hiramatsu |
| 2005/0226140 A1* | 10/2005 | Zhuang ............... H04B 1/69 370/203 |
| 2006/0205415 A1 | 9/2006 | Rezaiifar et al. |
| 2007/0041311 A1* | 2/2007 | Baum ................ H04L 5/0048 370/208 |
| 2007/0066232 A1 | 3/2007 | Black |
| 2011/0176448 A1 | 7/2011 | Rezaiifar et al. |
| 2014/0269616 A1 | 9/2014 | Black |

FOREIGN PATENT DOCUMENTS

| | | |
|---|---|---|
| EP | 1146761 A1 | 10/2001 |
| EP | 1480787 A1 | 12/2004 |
| JP | 8125604 A | 5/1996 |
| JP | 9294287 | 11/1997 |
| JP | 8125663 | 5/1998 |
| JP | 3112950 B2 | 11/2000 |
| JP | 2001119745 A | 4/2001 |
| JP | 2001128219 A | 5/2001 |
| JP | 2001244913 | 9/2001 |
| JP | 2001524789 A | 12/2001 |
| JP | 2002111740 A2 | 4/2002 |
| JP | 2002330096 A | 11/2002 |
| JP | 2002335557 A | 11/2002 |
| JP | 2003514484 A | 4/2003 |
| JP | 2003289575 A | 10/2003 |
| JP | 2004523934 | 8/2004 |
| JP | 2005039800 A | 2/2005 |
| KR | 100433390 | 5/2004 |
| KR | 100970632 | 7/2010 |
| RU | 2210864 | 8/2003 |
| WO | 1996016524 | 5/1996 |
| WO | 1996019879 | 6/1996 |
| WO | 9901956 A1 | 1/1999 |
| WO | 9927736 A1 | 6/1999 |
| WO | 2000018172 | 3/2000 |
| WO | 2000057664 | 9/2000 |
| WO | 2000076085 | 12/2000 |
| WO | 0137443 A1 | 5/2001 |
| WO | 0231991 | 4/2002 |
| WO | 2002161990 | 8/2002 |
| WO | 02087139 A1 | 10/2002 |
| WO | 2002087275 | 10/2002 |
| WO | 02087319 | 11/2002 |
| WO | 02102132 A2 | 12/2002 |
| WO | 03056869 A1 | 7/2003 |
| WO | 03096657 A2 | 11/2003 |
| WO | 2004071042 A1 | 8/2004 |
| WO | 05013509 | 2/2005 |
| WO | 2005020490 | 3/2005 |
| WO | 2006096764 A2 | 9/2008 |

OTHER PUBLICATIONS

Daniel Wong, et al., "Soft Handoffs in CDMA Mobile Systems", IEEE Personal Communications, Dec. 1997, pp. 6-17.

European Search Report—EP10008592 ,Search Authority—The Hague Patent Office, dated Sep. 14, 2010.

European Search Report—EP10008593 ,Search Authority—The Hague Patent Office, dated Sep. 14, 2010.

European Search Report—EP10163287, Search Authority—Munich Patent Office, dated Jul. 8, 2010.

International Preliminary Report on Patentability—PCT/US06/008222, The International Bureau of WIPO—Geneva, Switzerland, dated Sep. 12, 2007.

International Preliminary Report on Patentability—PCT/US06/037131, The International Bureau of WIPO—Geneva Switzerland, dated Mar. 26, 2008.

International Search Report—PCT/US06/037131, International Search Authority—European Patent Office, dated Apr. 11, 2007.

International Search Report—PCT/US06/008222, International Search Authority—European Patent Office, dated Sep. 4, 2006.

Kishiyama Y., et al., "Pilot channel using sector-specific orthogonal sequence in Evolved UTRA downlink OFDM wireless access," Collected papers vol. 1 of the Communication society conference 2005 of the Institute of Electronics, Information and Communication Engineers, Sep. 7, 2005, pp. 445, B-5-45.

Lee, H-S et al. "Cell search scheme using I/O multiplexed code assignment in asynchronous W-CDMA system," Vehicular Technology Conference, 1999 IEEE 49th, vol. 2, May 16-20, 1999, Houston, Tx, pp. 1560-1564.

Maeda N., et al., "Performance Comparisons between OFCDM and OFDM in a Forward Link Broadband Channel ," IEICE Technical Report, RCS2002-162 vol. 102, No. 282, Aug. 23, 2002, pp. 95-100.

Morimoto A., et al., "Experiments on fast sector selection with entire-bandwidth assignment in forward link for OFCDM broadband packet wireless access," Personal, Indoor and Mobile Radio Communications, 2004, PIMRC 2004, 15th IEEE International Symposium on Sep. 5-8, 2004, vol. 3, pp. 1689-1694.

Nortel Networks, "OFDM Unit Multiplexing", 3GPP TSG-RAN-1 Meeting #32, R1-030522, pp. 1-4, May 23, 2003.

(56) References Cited

OTHER PUBLICATIONS

Taiwan Search Report—TW095107098—TIPO—dated Jun. 25, 2013.
Translation of Office Action in Japanese application 2008-532453 corresponding to U.S. Appl. No. 11/523,959, citing JP2002525999, JP2001119745, US20040203420, JP2004523934, JP2003289575 and WO2006096764 dated Feb. 1, 2011.
Written Opinion—PCT/US06/037131, International Search Authority—European Patent Office, dated Apr. 11, 2007.
Written Opinion—PCT/US2006/008222, International Search Authority—European Patent Office—dated Sep. 4, 2006.

\* cited by examiner

so are dispersed

PILOT GROUPING AND ROUTE PROTOCOLS IN MULTI-CARRIER COMMUNICATION SYSTEMS

CLAIM OF PRIORITY UNDER 35 U.S.C. § 120

This Present Application for Patent is a Divisional Application of pending U.S. application Ser. No. 14/108,055 entitled "Pilot Grouping and Route Protocols in Multi-Carrier Communication Systems," filed Dec. 16, 2013, which is a Divisional Application of U.S. patent application Ser. No. 11/523,959, filed Sep. 19, 2006, entitled "Pilot Grouping and Route Protocols in Multi-Carrier Communication Systems," which further claims priority under 35 U.S.C. § 119 to U.S. Provisional Patent Application No. 60/719,760, filed on Sep. 22, 2005 entitled "Pilot Grouping And Route Protocols In Multi-Carrier Communication Systems," each assigned to the assignee hereof and hereby expressly incorporated by referenced herein."

CROSS REFERENCE TO RELATED APPLICATIONS

This Application for Patent is related to U.S. patent application Ser. No. 11/156,202, filed on Jun. 17, 2005, entitled "Pilot Grouping and Set Management in Multi-carrier Communication Systems," which claims priority under 35 U.S.C. § 119 to Provisional Patent Application No. 60/659,856, filed on Mar. 8, 2005, entitled "Pilot Strength Reporting and Active/Candidate/Neighbor Set Management for Multi-carrier System."

BACKGROUND

Field

This disclosure relates generally to wireless communications. More specifically, embodiments disclosed herein relate to pilot grouping and reporting, route protocols, and scheduling in multi-carrier communication systems.

Background

Wireless communication systems are widely deployed to provide various types of communication (e.g., voice, data, etc.) to multiple users. Such systems may be based on code division multiple access (CDMA), time division multiple access (TDMA), frequency division multiple access (FDMA), orthogonal frequency division multiple access (OFDMA), or other multiple access techniques. A communication system may be designed to implement one or more standards, such as IS-95, cdma2000, IS-856, W-CDMA, TD-SCDMA, and other standards.

As the demand for multimedia and high-rate data services rapidly grows, multi-carrier modulation has been attracted considerable attention in wireless communication systems. There lies a challenge to provide efficient and robust multi-carrier communication systems.

DETAILED DESCRIPTION

Embodiments disclosed herein relate to methods and systems for pilot grouping and reporting, route protocols, and scheduling in multi-carrier communication systems.

Figure 1:
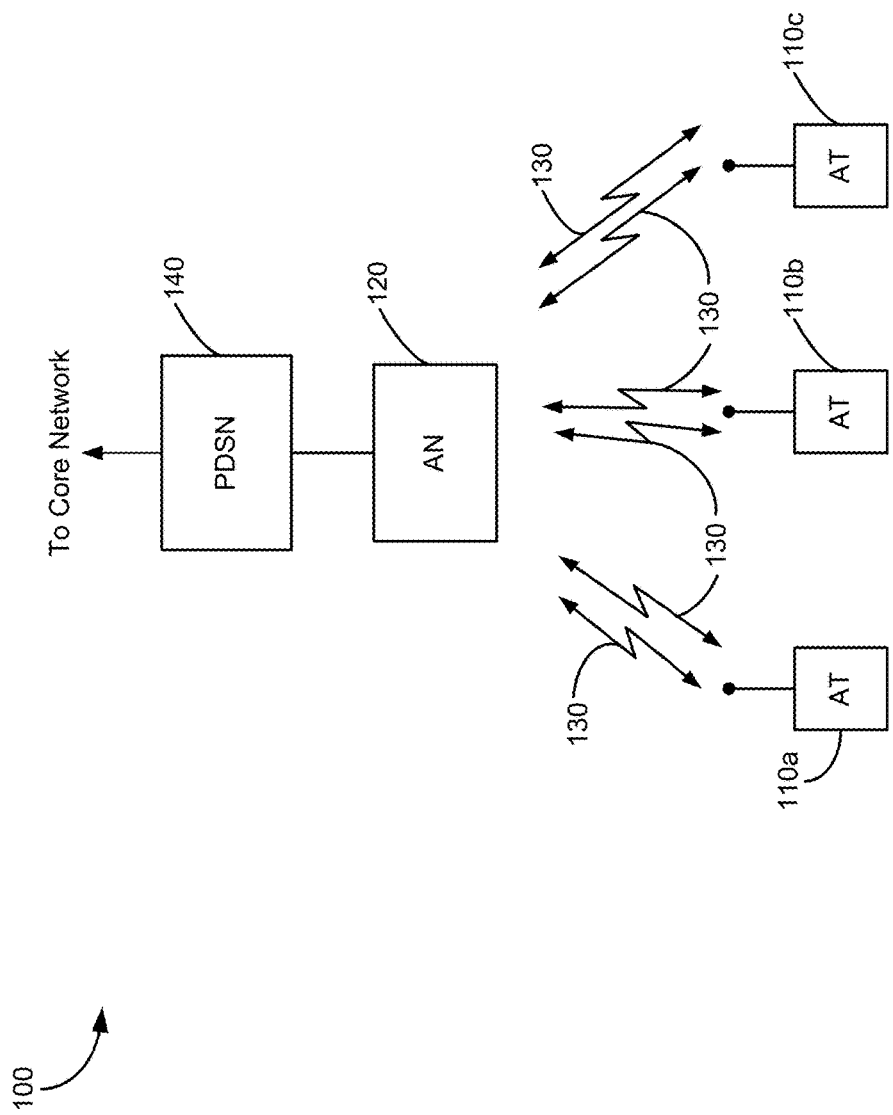
FIG. 1 illustrates an embodiment of a multi-carrier communication system.

FIG. 1 illustrates an embodiment of a multi-carrier communication system 100. By way of example, various access terminals (ATs) 110, including ATs 110a-110c, are dispersed throughout the system. Each AT 110 may communicate with an access network (AN) 120 via one or more channels at different frequencies on a forward link and/or a reverse link at a given moment, as illustrated by double-sided arrows 130. For illustration and clarity, two double-sided arrows 130 are shown for each AT 110. There may be any number of channels (or frequencies) on the forward link or reverse link in a communication system. Further, the number of frequencies on the forward link (or "forward link frequencies") need not be the same as the number of frequencies on reverse link (or "reverse link frequencies").

AN 120 may further be in communication with a core network, such as a packet data network via a packet data serving node (PDSN) 140. In an embodiment, system 100 may be configured to support one or more standards, e.g., IS-95, cdma2000, IS-856, W-CDMA, TD-SCDMA, other multi-carrier standards, or a combination thereof.

An AN described herein may refer to the portion of a communication system configured to interface with a core network (e.g., a packet data network via PDSN 140 in FIG. 1) and route data between ATs and the core network, perform various radio access and link maintenance functions, control radio transmitters and receivers, and so on. An AN may include and/or implement the functions of a base station controller (BSC) (such as found in a $2^{nd}$, $3^{rd}$, or $4^{th}$ generation wireless network), a base-station transceiver system (BTS), an access point (AP), a modem pool transceiver (MPT), a Node B (e.g., in a W-CDMA type system), etc.

An AT described herein may refer to various types of devices, including (but not limited to) a wireless phone, a cellular phone, a laptop computer, a wireless communication personal computer (PC) card, a personal digital assistant (PDA), an external or internal modem, etc. An AT may be any data device that communicates through a wireless channel and/or through a wired channel (e.g., by way of fiber optic or coaxial cables). An AT may have various names, such as access unit, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more ANs on a forward link and/or a reverse link at a given moment. The forward link (or downlink) refers to transmission from an AN to an AT. The reverse link (or uplink) refers to transmission from the AT to the AN.

A multi-carrier communication system described herein may include a frequency division multiplexing system, an orthogonal frequency division multiplexing system, or other multi-carrier modulation systems, where each carrier corresponds to a frequency range.

Figure 2:
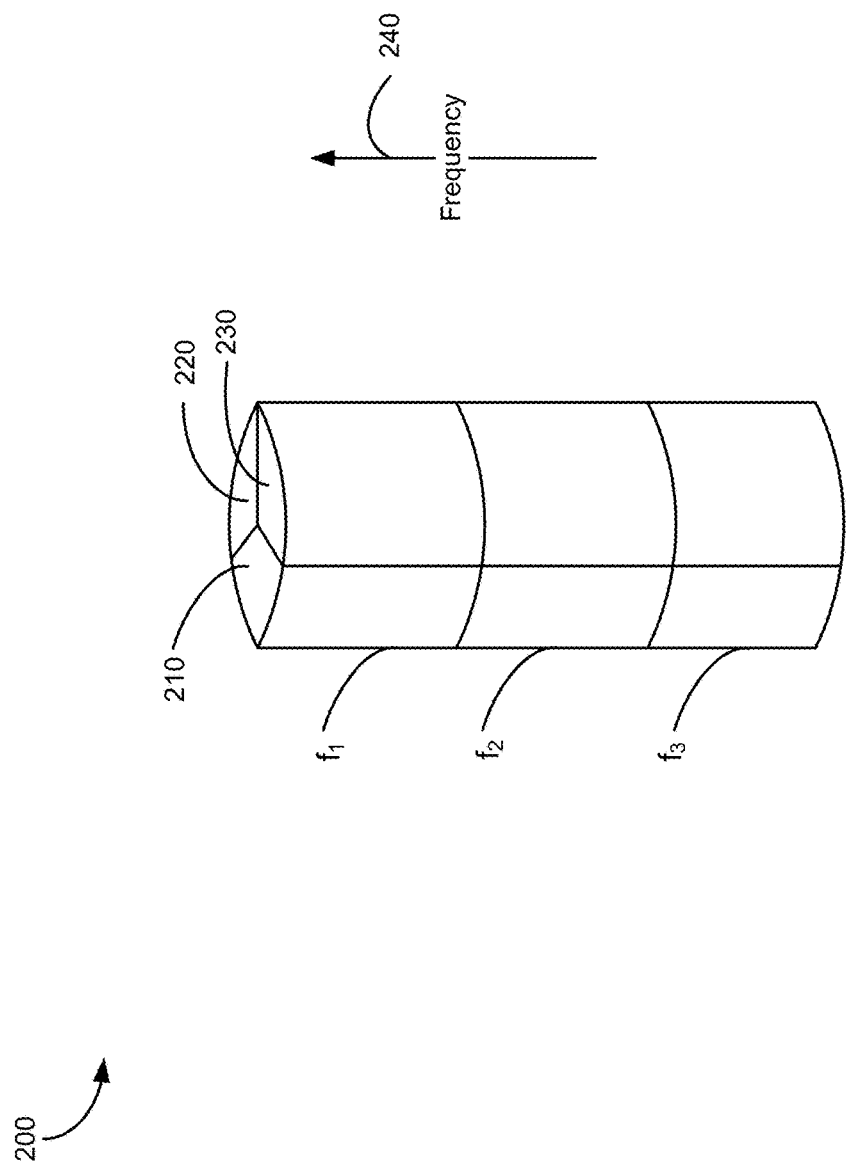
FIG. 2 illustrates an embodiment of a cell having multiple sectors in a multi-carrier communication system.

A cell may refer to a coverage area serviced by an AN. A cell may be divided into one or more sectors. One or more frequencies may be assigned to cover a cell. FIG. 2 illustrates an embodiment of a cell 200 in a multi-carrier communication system. By way of example, cell 200 is shown to be divided into three sectors 210, 220, 230. Three frequencies, $f_1$, $f_2$, $f_3$, are assigned to cover cell 200. For illustration and clarity, cell 200 is shown as a cylinder, whose cross-section area corresponds with cell 200's coverage area, and whose height along an axis 240 corresponds with the frequency dimension of cell 200. As such, each wedge of the cylinder (across all frequencies) constitutes a sector. In other embodiments, cells may have different shapes, and may have any number of sectors. There may also be any number of frequencies allocated to a cell. For example, in some situations, multiple frequencies may be allocated to a cell covering a large coverage area, such as shown in FIG. 2. In other situations, one frequency may be allocated to a cell covering a small dense area (e.g., a "hot spot").

A pilot signal (or "pilot") described herein may be characterized (or specified) by a set of parameters, e.g., denoted as <PN offset, channel> (or <channel, PN offset>), where "channel" may refer to the frequency of the pilot signal. The term "channel" may be used herein interchangeably with the term "frequency." Further, a "coverage area" of a pilot signal may refer to a "strength vs. distance" profile of the pilot signal.

In a single-carrier communication system, an AT is required to report the strengths of all the pilot signals received, as the pilot signals become strong or weak in strength. In a multi-carrier communication system, there may be multiple pilot signals associated with a sector, as shown in FIG. 2. If an AT were to report the strength of each pilot signal received (as in the single-carrier system), such would cause too many triggers for a pilot strength report (e.g., a route update message in an IS-856 type system) because there are more pilots signals and each of which may cross the reporting thresholds independently due to short-term fading; and each report would also be larger because there are more pilot signals to report. Further, many of these pilot signals may have comparable coverage areas and reporting one of them may provide sufficient information to the AN with regard to the set of pilot signals the AT is receiving. A need, therefore, exists for efficient management of pilot signals in multi-carrier communication systems.

Embodiments disclosed herein relate to methods and systems for pilot grouping and reporting, route protocols, and scheduling in multi-carrier communication systems.

Figure 3:
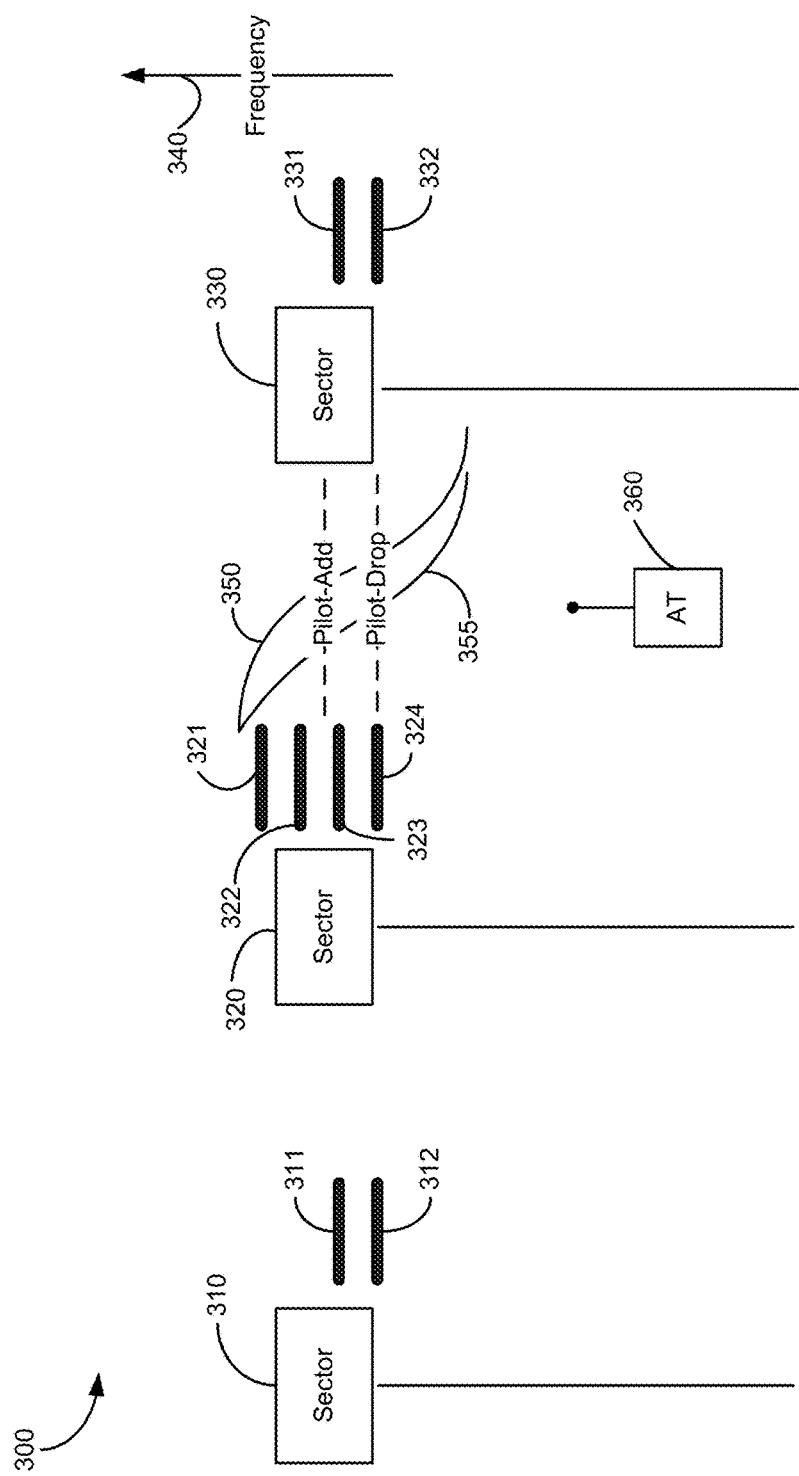
FIG. 3 illustrates an embodiment of several sectors and associated pilot signals in a multi-carrier communication system.

FIG. 3 illustrates an embodiment of several sectors and associated pilot signals in a multi-carrier communication system 300. System 300 may generally include any number of sectors, each associated with one or more pilot signals having distinct frequencies. For illustration and clarity, three sectors 310, 320, 330 are explicitly shown. Also shown by way of example are pilot signals 311, 312 associated with sector 310, pilot signals 321-324 associated with sector 320, and pilot signals 331, 332 associated with sector 330. These pilot signals are shown in reference to a frequency axis 340, indicating that pilot signals associated with a given sector have different frequencies.

FIG. 3 further illustrates a strength vs. distance profile 350 presenting the coverage area of pilot signal 321 or 322, and a strength vs. distance profile 355 presenting the coverage area of pilot signal 323 or 324.

In an embodiment, an AN (not explicitly shown) serving sector 320 may assign a group identifier (or ID) to each of pilot signals 321-324 based on their coverage areas, such that the pilot signals having the substantially same coverage area share a common group ID. PN offset may be used as the group ID in one embodiment. For example, pilot signals 321, 322 may share a common group ID (or PN offset); pilot signals 323, 324 may also share a common group ID (or PN offset). The AN may then transmit pilot signals 321-324 with the corresponding group IDs. Upon receiving pilot signals 321-324, an AT 360 may group pilot signals 321, 322 into a first pilot group and pilot signals 323, 324 into a second pilot group in accordance with their group IDs. AT 360 may select one pilot signal from each pilot group as a representative pilot signal for the group: e.g., pilot signal 321 may be selected as the representative pilot signal for the first pilot group, and pilot signal 324 may be selected as the representative pilot signal for the second pilot group. AT 360 may measure the strength of each received pilot signal, or at least one pilot signal from each pilot group (such as the representative pilot signal). AT 360 may include only the representative pilot signal (as opposed to the entire pilot group) in a pilot strength report, as further described below.

In FIG. 3, two pilot strength thresholds, "pilot-add" and "pilot-drop", are marked on profiles 350, 355. These thresholds may be used to determine to which one of AT 360's candidate set and neighbor set each received pilot signal belong. For example, if the strength of a pilot signal received by AT 360 exceeds the pilot-add threshold, the pilot signal may potentially be added to AT 360's candidate set, as further described below. If the strength of a pilot signal received by AT 360 falls below the pilot-drop threshold, the pilot signal may be removed from AT 360's active set or candidate set.

In one embodiment, as AT 360 moves away from sector 320, it may first detect that the strengths of pilot signals 323, 324 in the second pilot group fall below the pilot-drop threshold, and later those of pilot signals 321, 322 in the first pilot group. (Such may be due to that pilot signals 321, 322 do not have counterparts in neighboring sectors 310, 330, hence being subject to less interference.) As a result, AT 360 may first send a pilot strength report for the representative pilot signal associated with the second pilot group and later a pilot strength report for the representative pilot associated with the first pilot group to the AN, in connection with these two events. The pilot strength report may include, e.g., the strength, the PN offset, and the frequency of the corresponding representative pilot signal. In another embodiment, as AT 360 moves closer to sector 320, AT 360 may first send a pilot strength report for the representative pilot signal associated with the first pilot group and later a pilot strength report for the representative pilot associated with the second pilot group to the AN (in connection with the sequential rise of the strengths of the pilot signals in these two groups).

Further, pilot signals in sectors 310, 330 may also be grouped in a similar manner. For example, pilot signals 311, 312 in sector 310 may form a pilot group. Pilot signals 331, 332 in sector 330 may also form a pilot group. In an embodiment, sector 320 (or the AN servicing it) may select one pilot signal from each pilot group in neighbor sectors 310, 330, e.g., pilot signal 311 and pilot signal 332, and advertise only the selected pilot signals from its neighbor sectors.

The pilot grouping and reporting thus described allows ATs to communicate effectively with an AN in a multi-carrier communication system, while avoiding excessive use of network resources. It further allows an AT to perform set management effectively, as further described below.

In some embodiments, a pilot group may be identified by a set of parameters, e.g., <PN offset, GroupID>, where GroupID denotes a group ID, and the pilot signals having substantially the same coverage area fall within the same pilot group. An AT may further select a single pilot from each pilot group as the representative pilot for the group, and send a pilot strength report (e.g., a route update message) only for the representative pilot. By grouping the pilots in this manner, the AT need not send multiple reports for the pilots having substantially the same coverage area.

Figure 4:
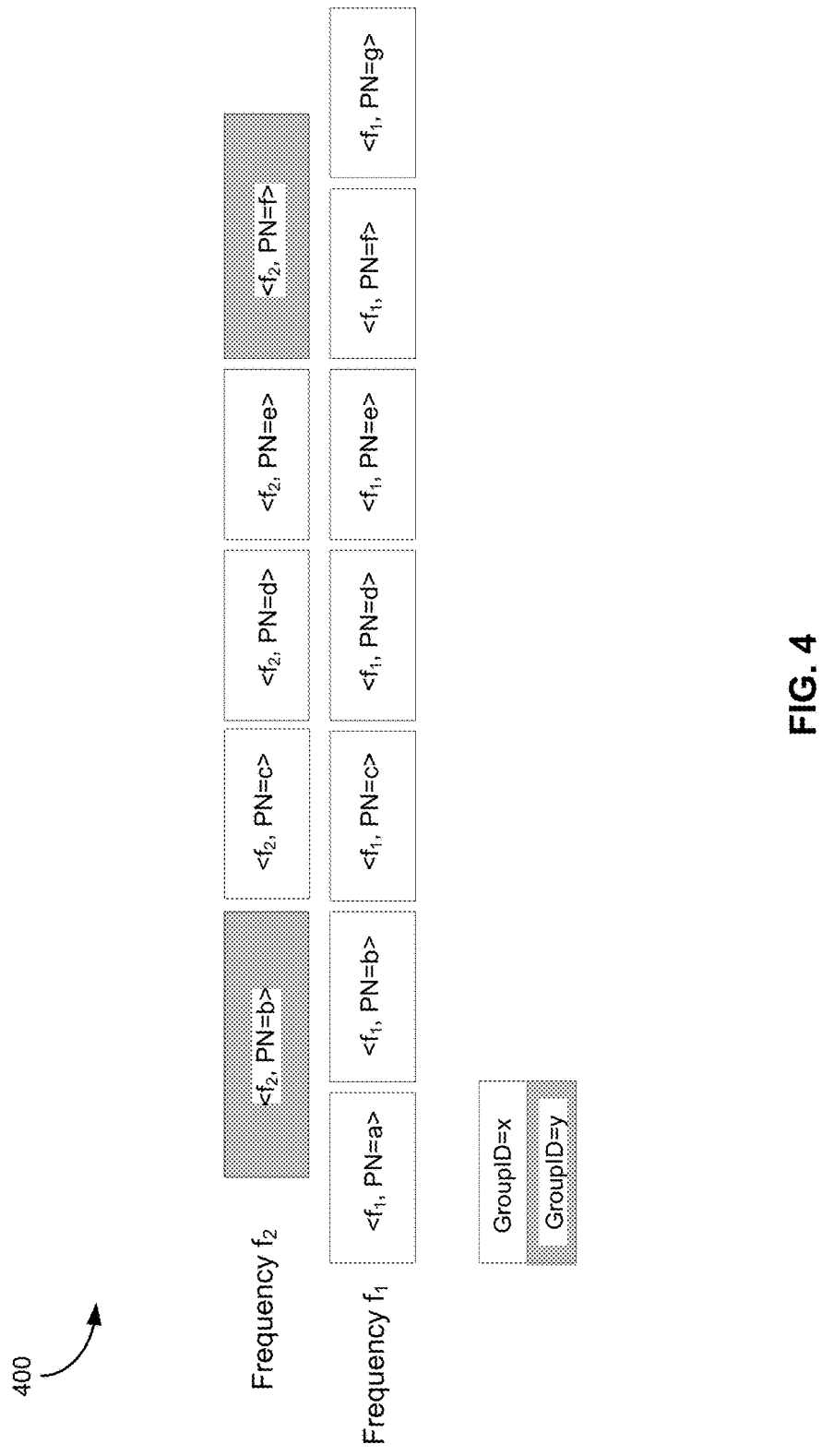
FIG. 4 illustrates an embodiment of pilot grouping in a multi-carrier communication system.

FIG. 4 illustrates an embodiment of pilot grouping in a multi-carrier communication system. For illustration and clarity, each pilot is represented by a box labeled with <frequency, PN offset>; further, the area of each box is shown to be in relation (e.g., proportional) to the coverage area of the associated pilot. For example, pilot <$f_2$, PN=b> is shown to have a larger coverage area than pilot <$f_1$, PN=b> associated with the same sector, due to no adjacent channel interference.

By way of example, GroupID=x and GroupID=y are shown to be associated with the pilots illustrated in FIG. 4. The sector associated with pilot <$f_1$, PN=a> may advertise pilots <$f_1$, PN=b, GroupID=x> and <$f_2$, PN=b, GroupID=y> as neighbors. As such, the pilot grouping thus described allows the AN to get separate pilot strength reports from the AT when the coverage areas of the co-located pilots are different and to use the same pilot PN planning in the overlaid frequency.

Figure 5:
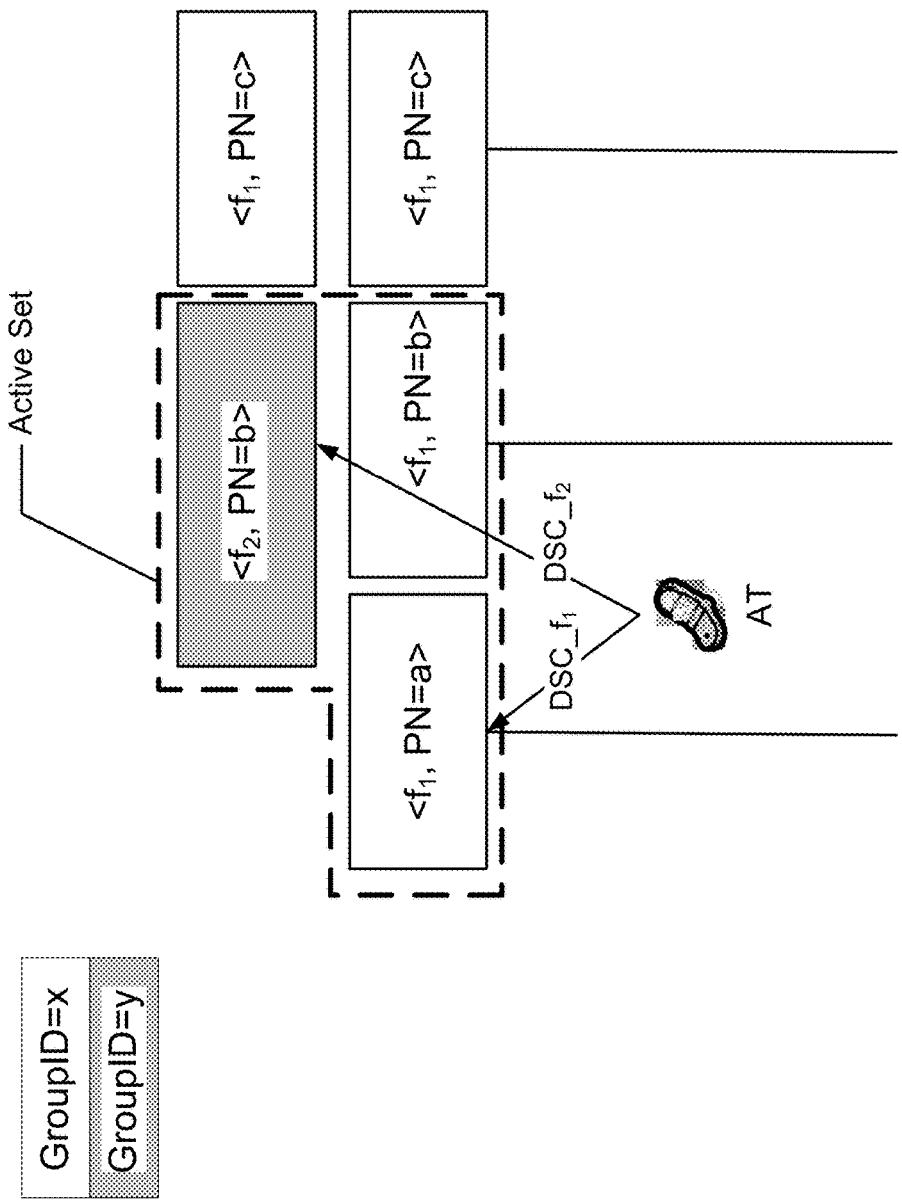
FIG. 5 illustrates a section of the embodiment of FIG. 4.

In an embodiment, to take advantage of the additional coverage of pilot <$f_2$, PN=b>, the AT may be allowed to point its data source control (DSC) channel to different cells (e.g., those in its active set) on different frequencies, such as DSC_$f_1$ and DSC_$f_2$ illustrated in FIG. 5. For example, if the AT is allowed to point its DSC only to the cell with PN=a, then it may get only the single carrier coverage as there is no coverage on frequency $f_2$. On the other hand, if the AT is allowed to point its DSC only to the sector with PN=b on frequency $f_1$, it may get a bad coverage associated with pilot <$f_1$, PN=b>, because it is closer to pilot <$f_1$, PN=a>.

Figure 6A:
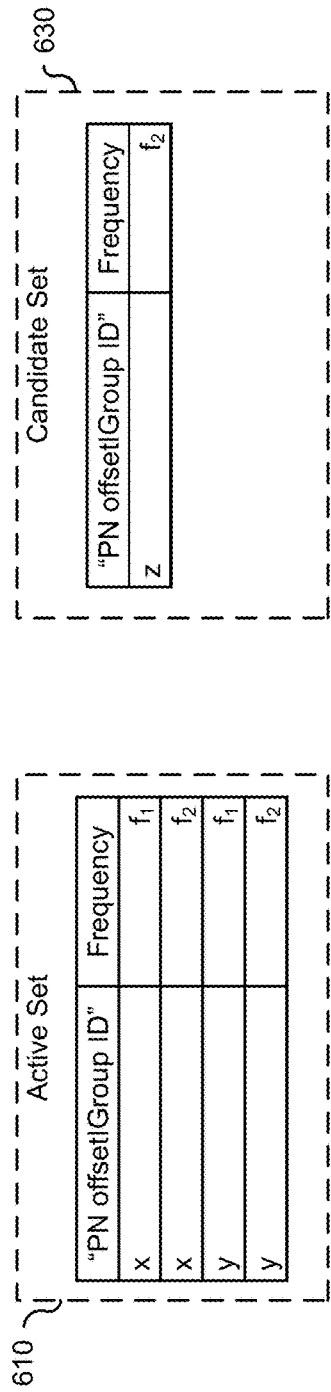
FIGS. 6A-6C illustrate an embodiment of set management in a multi-carrier communication system.
Figure 6B:
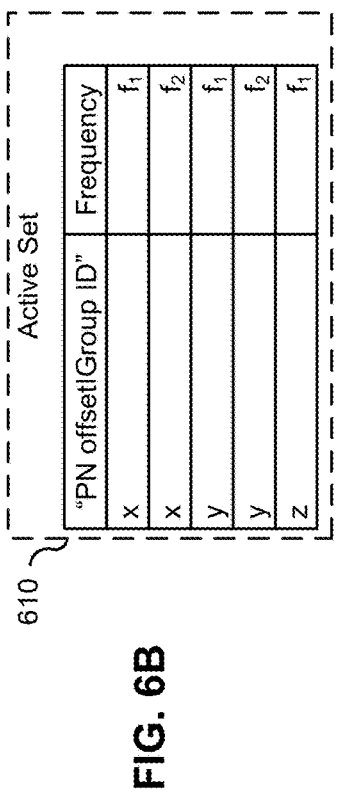
Figure 6C:
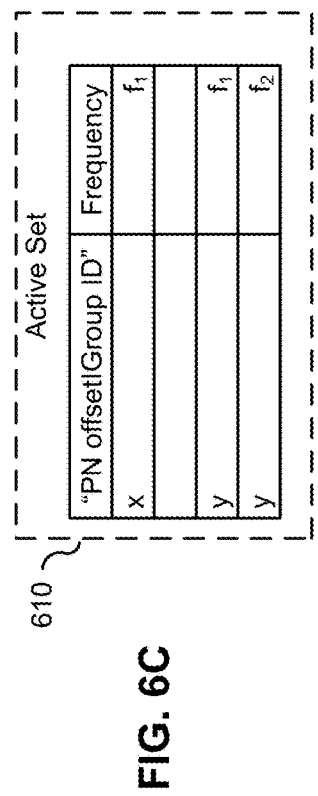

FIGS. 6A-6C illustrate an embodiment of set management in a multi-carrier communication system. For clarity and illustration, each pilot signal is specified by <"PN offset|GroupID", frequency>. By way of example, FIG. 6A shows that an AT (not explicitly shown) may initially have an active set 610 including a first pilot group and a second pilot group. The first pilot group includes two pilot signals specified by <x, $f_1$> and <x, $f_2$>, and the second pilot group includes two pilots specified by <y, $f_1$> and <y, $f_2$>. The AT may also have a candidate set 620, which may initially include, a third pilot group having one pilot specified by <z, $f_2$>.

FIG. 6B illustrates one example, where a pilot specified by <z, $f_1$> is added to active set 610. As a result, a pilot specified by <z, $f_2$> is removed from candidate set 620, because both would belong to the same pilot group.

FIG. 6C illustrates another example, where a pilot specified by <x, $f_2$> is removed from active set 610 and is not added to candidate set 620. This is because there remains another pilot specified by <x, $f_1$> belonging to the first pilot group in active set 610.

The pilot grouping disclosed herein allows for efficient set management in a multi-carrier system. There may be other embodiments of set management.

Figure 7:
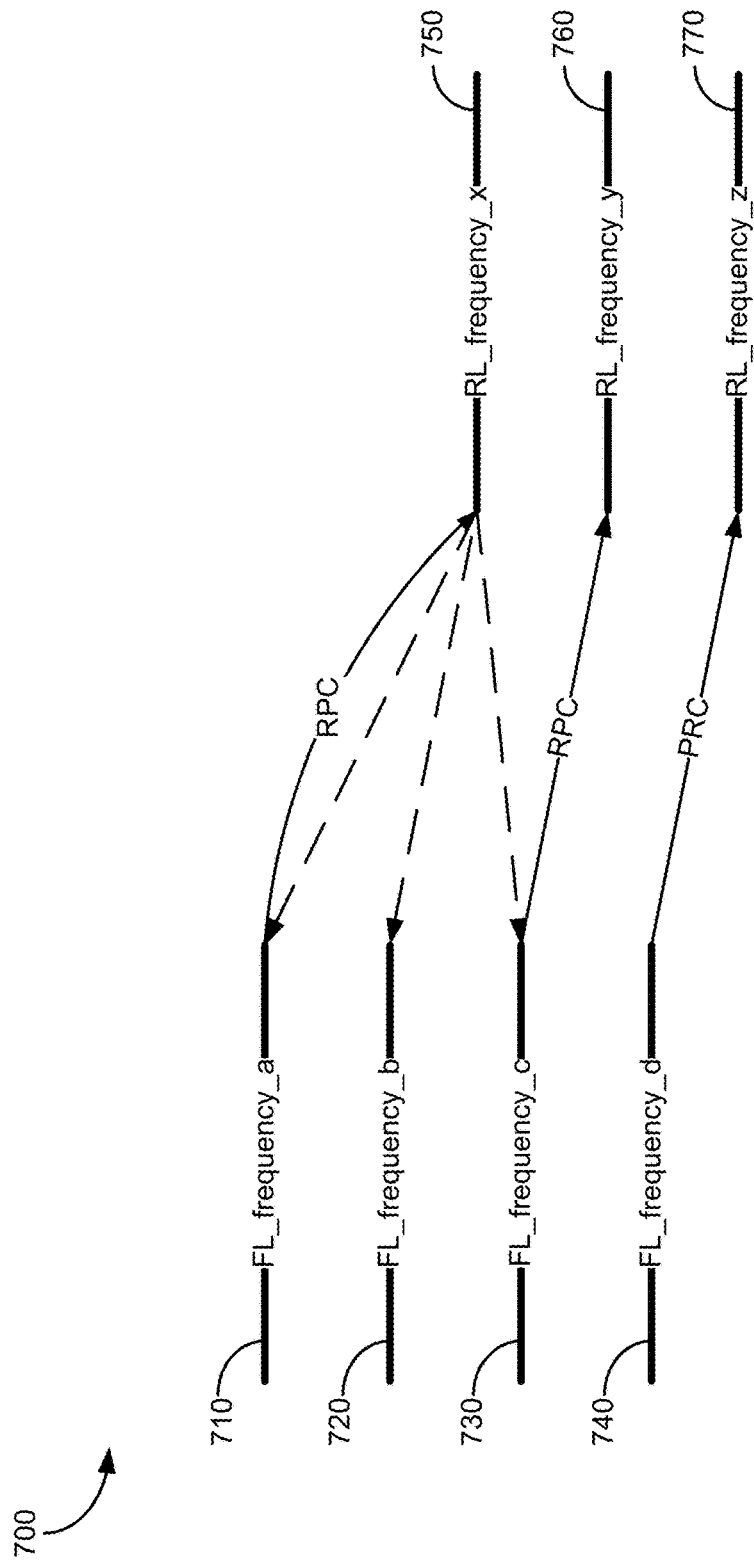
FIG. 7 illustrates an embodiment of traffic channel assignment in a multi-carrier communication system.

FIG. 7 illustrates an embodiment of how information may be conveyed in the traffic channel assignment in a multi-carrier communication system. A traffic channel assignment (TCA) message from an AN to an AT may carry various types of information, including (but not limited to):

Pilots in the AT's active set.

Frequencies on which the AT may transmit.

<FeebackMultiplexingIndex, RL frequencies>, where "FeebackMultiplexingIndex" indicates how the following information related to multiple forward link (FL) channels may be multiplexed into a single reverse link (RL) channel: information such as cell selection, hybrid automatic repeat request (ARQ) acknowledgement (ACK), signal-to-noise-and-interference ratio (C/I) feedback, etc.

Data rate control (DRC) cover and DSC for each sector/cell in the AT's active set.

For example, one or more FL channels associated with a plurality (or first set) of frequencies, including FL channel 710 at FL_frequency_a, FL channel 720 at FL_frequency_b, FL channel 730 at FL_frequency_c, and FL channel 740 at FL_frequency_d, are to be transmitted from an AN to an AT (both not explicitly shown). One or more RL channels associated with a second set of frequencies, including RL channel 750 at RL_frequency_x, RL channel 760 at RL_frequency_y, and RL channel 770 at RL_frequency_z, are assigned to the AT. In an embodiment, the AN may assign a subset of the FL channels each to carry RL-related information (e.g., a reverse power control (RPC) bit stream) for each of the RL channels assigned to the AT. For example, FL channel 720 may be assigned to carry the RPC bit stream for RL channel 750, FL channel 730 may be assigned to carry the RPC bit stream for RL channel 760, and FL channel 740 may be assigned to carry the RPC bit stream for RL channel 770, such as illustrated in FIG. 7. Note, in this assignment, each pair of FL and RL channels need not have the same frequency.

In an embodiment, the AN may select one of the FL channels, e.g., FL channel 720, as the "primary FL channel," and inform the AT to monitor the control channel carried by the primary FL channel (e.g., for supervision and other purposes). In this way, the AT may ignore other FL channels insofar as monitoring the control channel is concerned.

In some embodiments, an RL channel may also carry FL-related information for one or more FL channels. For example, as illustrated by dashed lines in FIG. 7, RL channel 750 may carry FL-related information for each of FL channels 710, 720, 730, which may include (but is not limited to) cell selection, sector selection, hybrid ARQ ACK, C/I feedback, etc.

Figure 8:
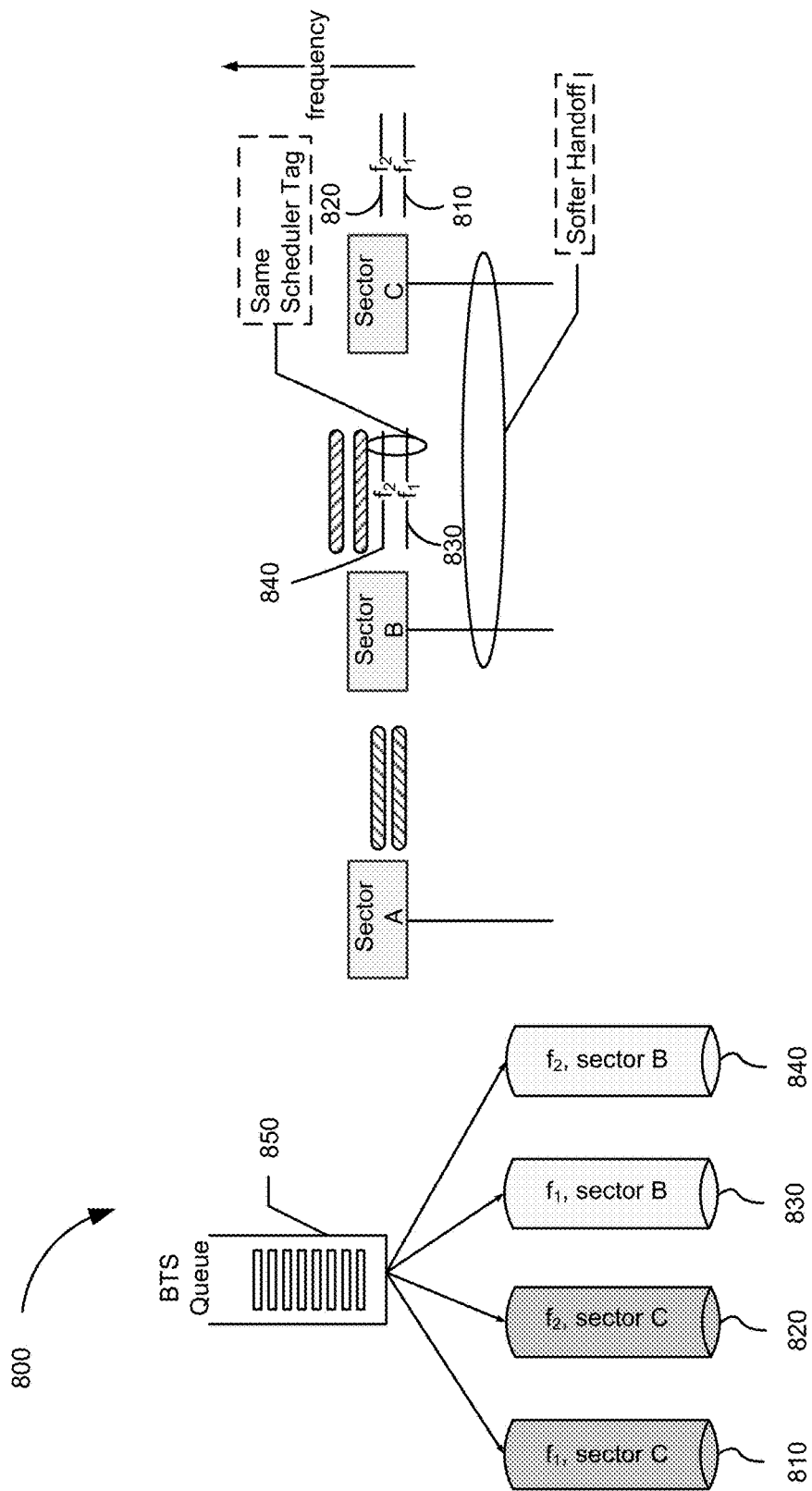
FIG. 8 illustrates an embodiment of scheduling in a multi-carrier communication system.

FIG. 8 illustrates an embodiment of scheduler groups in a multi-carrier communication system. If a plurality of pilots belong to the same scheduler group, they may for example share the same sequence number (e.g., ARQ or "Quick-NAK" sequence number) in multi-link radio link protocol (RLP), where the sequence number may be associated with detecting gap(s) in the data packet received through a single carrier. By way of example, pilots 810, 820, 830, 840 (shown with solid shading) may belong to the same scheduler group and share BTS queue 850 in the same scheduling, as shown on the left hand side of the figure.

In some embodiments, a plurality of pilots may belong to the same scheduler group under any of the following conditions:

The scheduler tags associated with the pilots are the same (such as illustrated in FIG. 8).

The pilots are in the same sub-active set of the AT (which may include potential sectors to which the AT may point its DRC cover) and belong to the sectors (e.g., sectors B and C) that are in softer handoff with each other (such as identified in the TCA message).

In some instances, if the TCA message does not specify the scheduler tag for a pilot in the active set of the AT, then the scheduler tag associated with that pilot may be assumed to be a number different from other scheduler tag(s) specified in the message.

Figure 9:
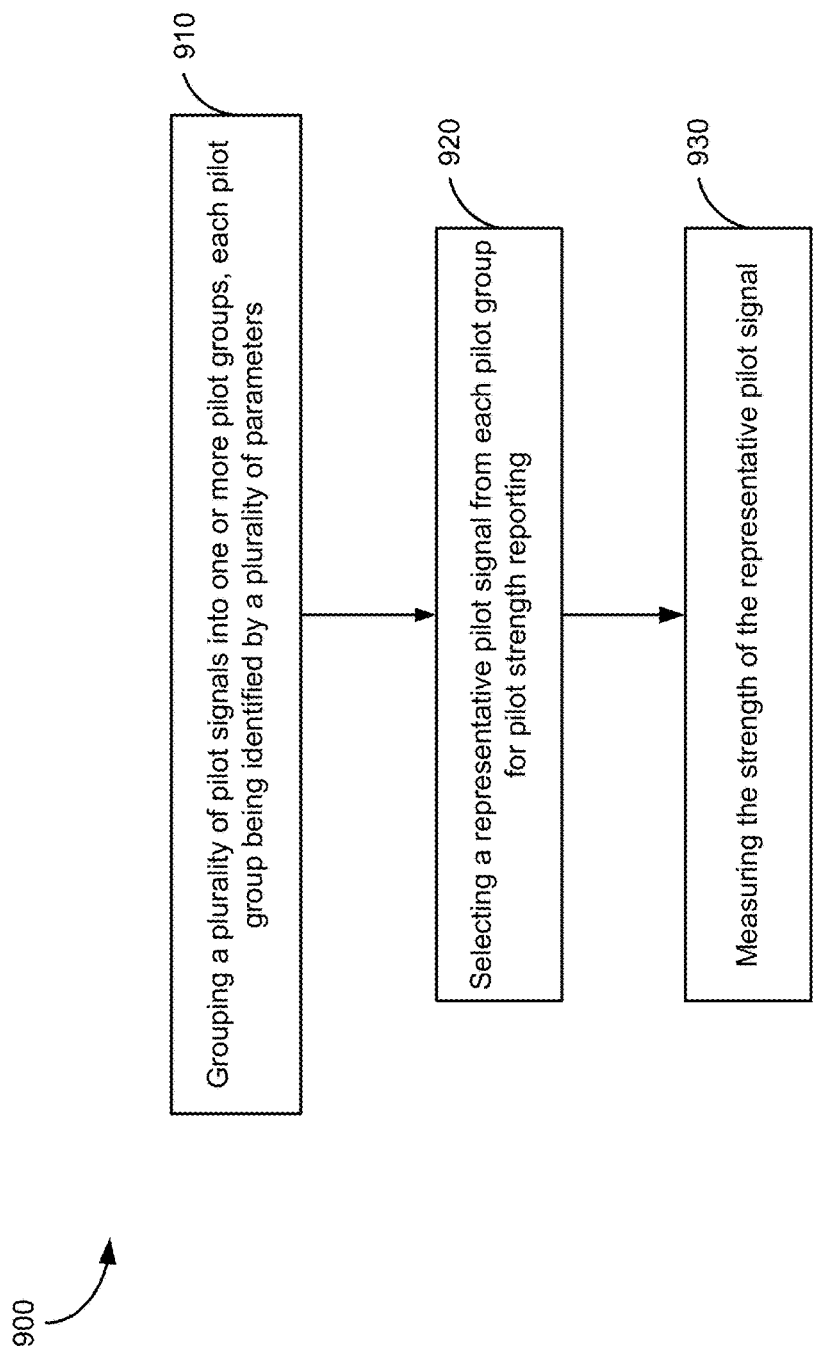
FIG. 9 illustrates a flow chart of a process, which may be used in an embodiment to implement pilot grouping and reporting in a multi-carrier communication system.

FIG. 9 illustrates a flow diagram of a process 900, which may be used in an embodiment to implement pilot grouping and reporting in a multi-carrier communication system. Step 910 groups a plurality of pilot signals into one or more pilot groups, each pilot group being identified by a plurality of parameters (e.g., PN offset and GroupID, such as described above). Step 920 selects a representative pilot signal from each pilot group for pilot strength reporting (such as described above). Process 900 may further include measuring the strength of the representative pilot signal, as shown in step 930.

Figure 10:
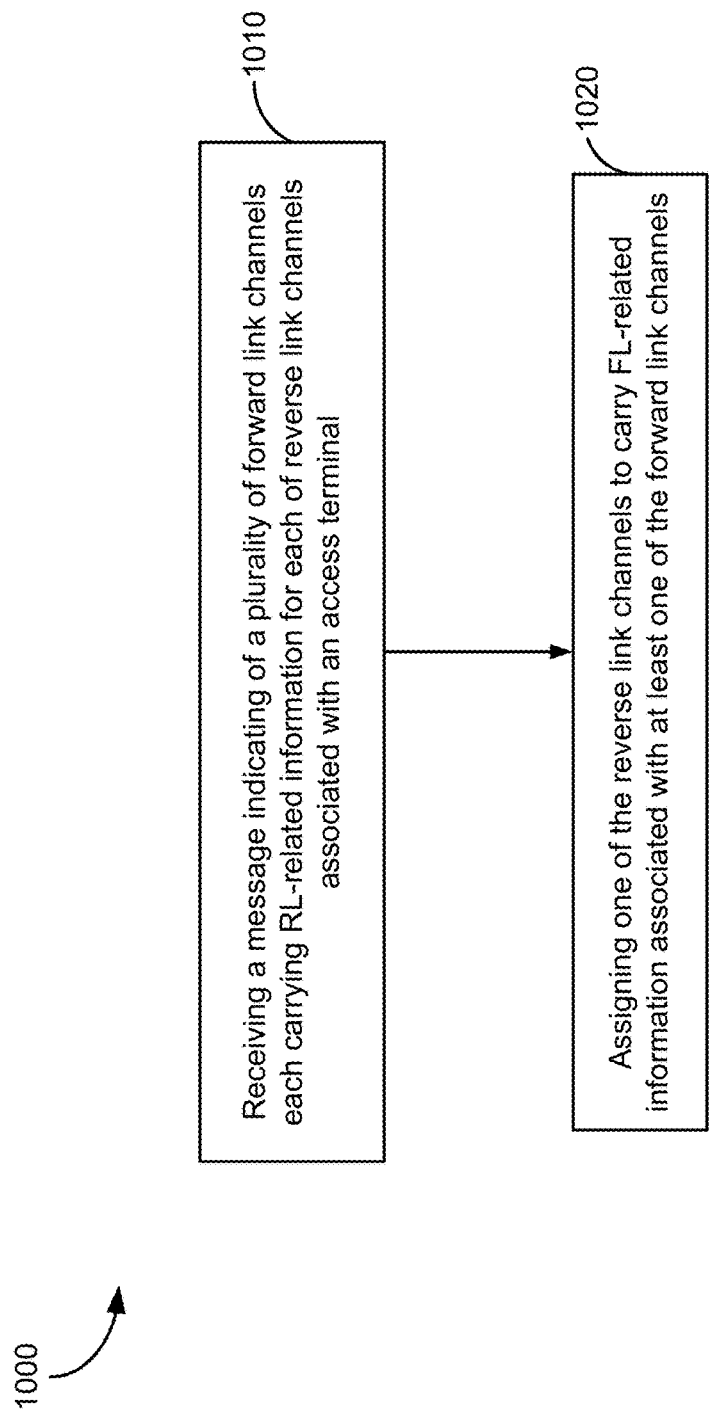
FIG. 10 illustrates a flow chart of a process, which may be used in connection with traffic channel assignment in a multi-carrier communication system.

FIG. 10 illustrates a flow diagram of a process 1000, which may be used in connection with traffic channel assignment in a multi-carrier communication system. Step 1010 receive a message (e.g., a TCA message such as described above) indicating a plurality of forward link channels each carrying RL-related information for each of reverse link channels associated with an access terminal. Step 1020 assigns one of the reverse link channels to carry FL-related information associated with at least one of the forward link channels (such as described above).

Figure 11:
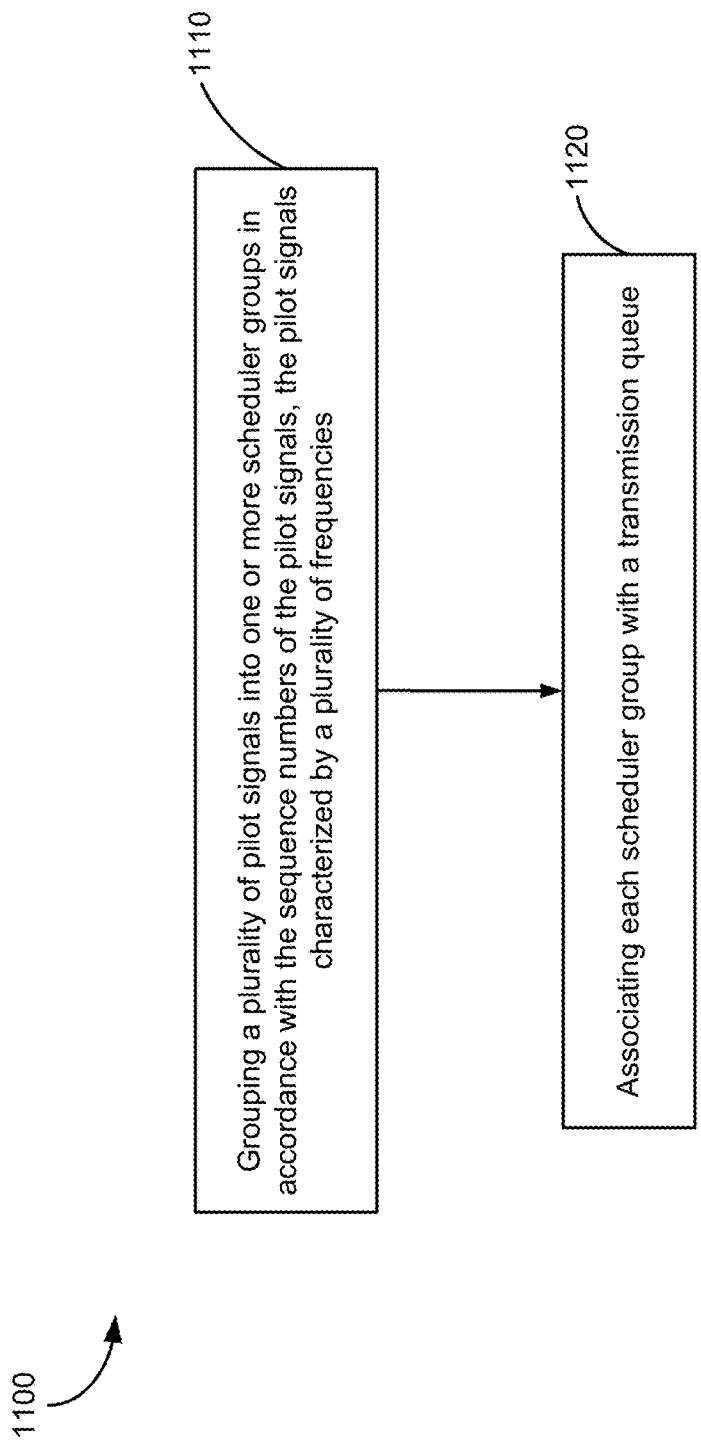
FIG. 11 illustrates a flow chart of a process, which may be used in connection with scheduling in a multi-carrier communication system.

FIG. 11 illustrates a flow diagram of a process 1100, which may be used in connection with scheduling in a multi-carrier communication system. Step 1110 groups a plurality of pilot signals into one or more scheduler groups in accordance with the sequence numbers of the pilot signals, wherein the pilot signals are characterized by a plurality of frequencies. Step 1120 associates each scheduler group with a transmission queue (such as described above).

Figure 12:
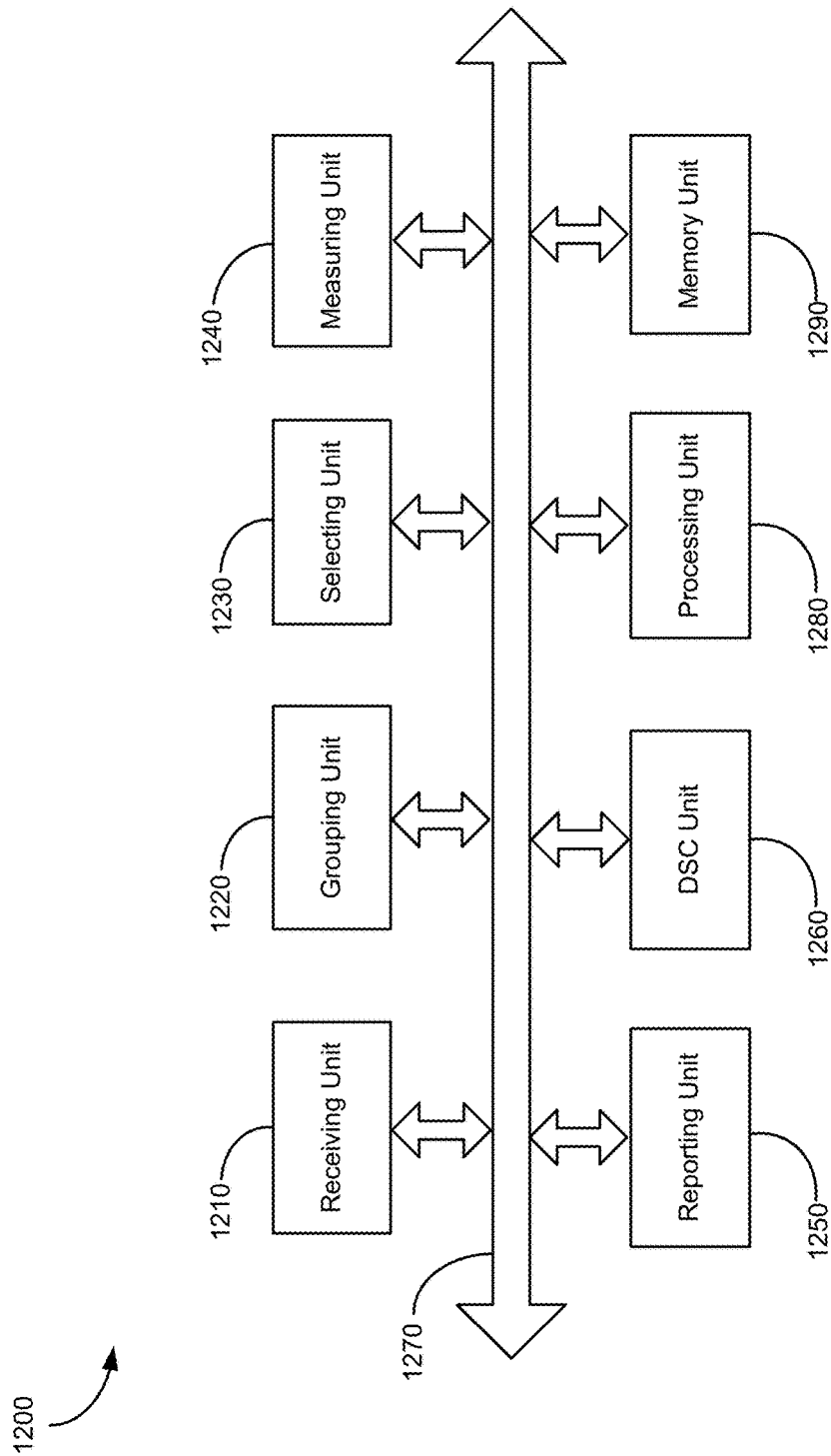
FIG. 12 illustrates a block diagram of an apparatus, in which some disclosed embodiments may be implemented.

FIG. 12 shows a block diagram of an apparatus 1200, which may be used to implement some disclosed embodiments (such as described above). By way of example, apparatus 1200 may include a receiving unit (or module) 1210 configured to receive a plurality of pilot signals characterized by a plurality of frequencies; a grouping unit 1220 configured to group the pilot signals into one or more pilot groups, each pilot group identified by a plurality of parameters (e.g., PN offset and GroupID, such as descried above); and a selecting unit 1230 configured to select a representative pilot signal from each pilot group for pilot strength reporting. Apparatus 1200 may further include a measuring unit 1240 configured to measure the strengths of the pilot signals (e.g., the strength of the representative pilot signal associated with each pilot group), and a reporting unit 1250 configured to configured to report the strength of the representative pilot signal for each pilot group to an AN (e.g., as the strengths of the pilot signals in the pilot group exceed the pilot-add threshold, or fall below the pilot-drop threshold, such as described above). Apparatus 1200 may also include a DSC unit 1260 configured to determine/point the DSC associated with an AT to each of a plurality of cells on different frequencies (such as described above).

In apparatus 1200, receiving unit 1210, grouping unit 1220, selecting unit 1230, measuring unit 1240, reporting unit 1250, and DSC unit 1260 may be coupled to a communication bus 1270. A processing unit 1280 and a memory unit 1290 may also be coupled to communication bus 1270. Processing unit 1280 may be configured to control and/or coordinate the operations of various units. Memory unit 1290 may embody instructions to be executed by processing unit 1280. In some embodiments, memory unit 1290 may also store an AT's active set, candidate set, and neighbor set (such as described above).

Figure 13:
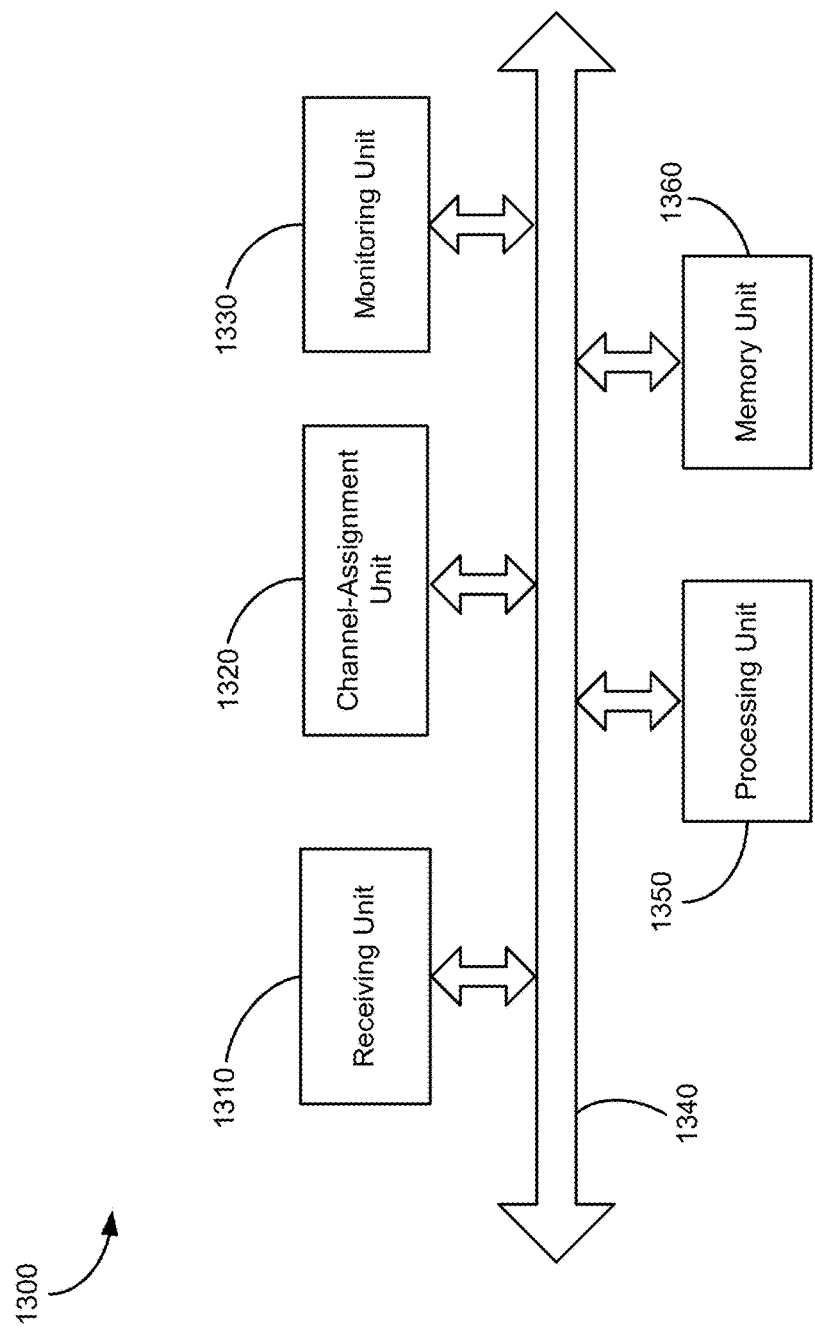
FIG. 13 illustrates a block diagram of an apparatus, in which some disclosed embodiments may be implemented.

FIG. 13 illustrates a block diagram of an apparatus 1300, which may be used to implement some disclosed embodiments (such as described above). By way of example, apparatus 1300 may include a receiving unit (or module) 1310 configured to receive a message (e.g., a TCA message described above) indicating a plurality of forward link channels each carrying RL-related information for each of reverse link channels associated with an access terminal; and a channel-assignment unit 1320 configured to assign one of the reverse link channels to carry FL-related information associated with at least one of the forward link channels (such as described above). Apparatus 1300 may further include a monitoring unit 1330 configured to monitor the control channel carried by one of the forward link channels (e.g., the primary FL channel described above).

In apparatus 1300, receiving unit 1310, channel-assignment unit 1320, and monitoring unit 1330 may be coupled to a communication bus 1340. A processing unit 1350 and a memory unit 1360 may also be coupled to communication bus 1340. Processing unit 1350 may be configured to control and/or coordinate the operations of various units. Memory unit 1360 may embody instructions to be executed by processing unit 1350. Apparatus 1300 may for example be implemented in an AT, or other communication devices.

Figure 14:
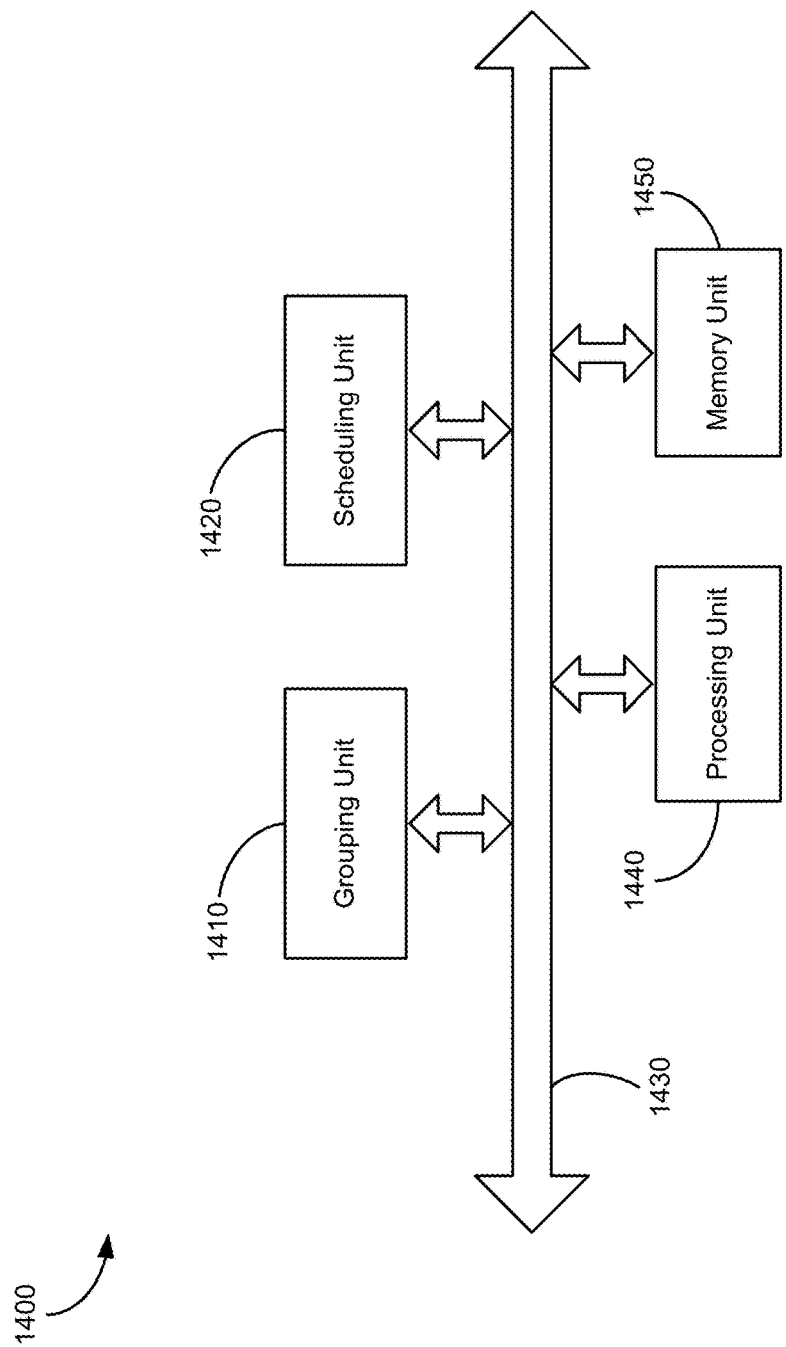
FIG. 14 illustrates a block diagram of an apparatus, in which some disclosed embodiments may be implemented.

FIG. 14 illustrates a block diagram of an apparatus 1400, which may be used to implement some disclosed embodiments (such as described above). By way of example, apparatus 1400 may include a grouping unit 1410 configured to group a plurality of pilot signals into one or more scheduler groups (e.g., in accordance with the sequence numbers of the pilot signals); and a scheduling unit 1420 configured to associate each scheduler group with a transmission queue (such as described above).

In apparatus 1400, grouping unit 1410 and scheduling unit 1420 may be coupled to a communication bus 1430. A processing unit 1440 and a memory unit 1450 may also be coupled to communication bus 1430. Processing unit 1440 may be configured to control and/or coordinate the operations of various units. Memory unit 1450 may embody instructions to be executed by processing unit 1440. Apparatus 1400 may for example be implemented in an AN, or other network elements.

Embodiments disclosed herein provide some embodiments of pilot signal grouping and reporting, set management, route protocols, and scheduling in a multi-carrier communication system. There are other embodiments and implementations.

Various units/modules in FIGS. 12-14 and other embodiments may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or processing unit). The memory unit may be implemented within the processor or external to the processor, in which case it can be communicatively coupled to the processor via various means known in the art.

Various disclosed embodiments may be implemented in an AN, an AT, and other elements in multi-carrier communication systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a multi-carrier communication system, comprising:
   receiving a plurality of pilot signals;
   grouping the plurality of pilot signals into one or more scheduler groups in accordance with sequence numbers of the pilot signals, the pilot signals characterized by a plurality of frequencies;
   associating each scheduler group with a transmission queue; and
   transmitting at least a pilot strength report for a representative pilot signal in each scheduler group.

2. The method of claim 1, wherein each scheduler group includes one or more pilot signals having a same sequence number.

3. The method of claim 2, wherein the sequence number is associated with detecting gaps in a received data packet.

4. The method of claim 2, wherein the sequence number is associated with detecting gaps in a data packet received through a single carrier.

5. The method of claim 1, wherein each scheduler group includes one or more pilot signals associated with a sub-active set of an access terminal.

6. The method of claim 5, wherein the one or more pilot signals in each scheduler group are associated with a plurality of sectors in a softer handoff.

7. The method of claim 5, wherein the sub-active set includes potential sectors to which the access terminal points a data rate control cover.

8. The method of claim 1, further comprising:
   associating a scheduler tag with the plurality of pilot signals, wherein the scheduler tag is same for each of the plurality of pilot signals in a scheduler group.

9. An apparatus adapted for multi-carrier communications, comprising:
   means for receiving a plurality of pilot signals;
   means for grouping the plurality of pilot signals into one or more scheduler groups in accordance with sequence numbers of the pilot signals, the pilot signals characterized by a plurality of frequencies;
   means for associating each scheduler group with a transmission queue; and
   means for transmitting at least a pilot strength report for a representative pilot signal in each scheduler group.

10. The apparatus of claim 9, wherein each scheduler group includes one or more pilot signals having a same sequence number.

11. The apparatus of claim 10, wherein the sequence number is associated with detecting gaps in a received data packet.

12. The apparatus of claim 9, wherein each scheduler group includes one or more pilot signals associated with a sub-active set of an access terminal.

13. The apparatus of claim 12, wherein the one or more pilot signals in each scheduler group are associated with a plurality of sectors in a softer handoff.

14. The apparatus of claim 12, wherein the sub-active set includes potential sectors to which the access terminal points a data rate control cover.

15. The apparatus of claim 9, further comprising:
means for associating a scheduler tag with the plurality of pilot signals, wherein the scheduler tag is same for each of the plurality of pilot signals in a scheduler group.

16. An apparatus adapted for multi-carrier communications, comprising:
a memory; and
at least one processor coupled to the memory, and wherein the processor is configured to:
receive a plurality of pilot signals
group the plurality of pilot signals into one or more scheduler groups in accordance with sequence numbers of the pilot signals, the pilot signals characterized by a plurality of frequencies;
associate each scheduler group with a transmission queue; and
transmit at least a pilot strength report for a representative pilot signal in each scheduler group.

17. The apparatus of claim 16, wherein the processor further configures each scheduler group to include one or more pilot signals having a same sequence number.

18. The apparatus of claim 17, wherein the processor is further configured to associate the sequence number with detecting gaps in a received data packet.

19. The apparatus of claim 16, wherein the processor further configures each scheduler group to include one or more pilot signals associated with a sub-active set of an access terminal.

20. The apparatus of claim 19, wherein the processor is further configured to associate the one or more pilot signals in each scheduler group with a plurality of sectors in a softer handoff.

21. The apparatus of claim 19, wherein the processor is further configures the sub-active set to include potential sectors to which the access terminal points a data rate control cover.

22. The apparatus of claim 16, wherein the processor is further configured to:
associate a scheduler tag with the plurality of pilot signals, wherein the scheduler tag is same for each of the plurality of pilot signals in a scheduler group.

23. A non-transitory computer readable medium storing computer executable code for multi-carrier communications that, when executed by a processor, cause the processor to:
receive a plurality of pilot signals
group the plurality of pilot signals into one or more scheduler groups in accordance with sequence numbers of the pilot signals, the pilot signals characterized by a plurality of frequencies;
associate each scheduler group with a transmission queue; and
transmit at least a pilot strength report or a representative pilot signal in each scheduler group.

24. The non-transitory computer readable medium of claim 23, wherein each scheduler group includes one or more pilot signals having a same sequence number.

25. The non-transitory computer readable medium of claim 24, wherein the sequence number is associated with detecting gaps in a received data packet.

26. The non-transitory computer readable medium of claim 24, wherein the sequence number is associated with detecting gaps in a data packet received through a single carrier.

27. The non-transitory computer readable medium of claim 23, wherein each scheduler group includes one or more pilot signals associated with a sub-active set of an access terminal.

28. The non-transitory computer readable medium of claim 27, wherein the one or more pilot signals in each scheduler group are associated with a plurality of sectors in a softer handoff.

29. The non-transitory computer readable medium of claim 27, wherein the sub-active set includes potential sectors to which the access terminal points a data rate control cover.

30. The non-transitory computer readable medium of claim 23, further comprising:
code for associating a scheduler tag with the plurality of pilot signals, wherein the scheduler tag is same for each of the plurality of pilot signals in a scheduler group.

* * * * *